(12) United States Patent
Jacobson et al.

(10) Patent No.: US 7,986,535 B2
(45) Date of Patent: Jul. 26, 2011

(54) METHODS AND APPARATUS FOR A CASCADE CONVERTER USING SERIES RESONANT CELLS WITH ZERO VOLTAGE SWITCHING

(75) Inventors: Boris S. Jacobson, Westford, MA (US); Evgeny N. Holmansky, Acton, MA (US)

(73) Assignee: Raytheon Company, Waltham, MA (US)

( * ) Notice: Subject to any disclaimer, the term of this patent is extended or adjusted under 35 U.S.C. 154(b) by 525 days.

(21) Appl. No.: 12/170,498

(22) Filed: Jul. 10, 2008

(65) Prior Publication Data

US 2009/0021966 A1 Jan. 22, 2009

Related U.S. Application Data

(60) Provisional application No. 60/950,130, filed on Jul. 17, 2007, provisional application No. 60/950,383, filed on Jul. 18, 2007.

(51) Int. Cl.
*H02M 3/335* (2006.01)

(52) U.S. Cl. .............................. 363/17; 363/65; 363/98

(58) Field of Classification Search .................... 363/17, 363/65, 98
See application file for complete search history.

(56) References Cited

U.S. PATENT DOCUMENTS

| | | | |
|---|---|---|---|
| 5,065,300 A | 11/1991 | Jacobson et al. |
| 5,151,852 A | 9/1992 | Jacobson et al. |
| 5,155,675 A | 10/1992 | Maruyama et al. |
| 5,181,170 A | 1/1993 | Huang et al. |
| 5,264,736 A | 11/1993 | Jacobson |
| 5,265,545 A | 11/1993 | Milner |
| 5,361,196 A | 11/1994 | Tanamachi et al. |
| 5,459,655 A | 10/1995 | Mori et al. |
| 5,638,263 A | 6/1997 | Opal et al. |
| 5,986,909 A | 11/1999 | Hammond et al. |
| 6,005,788 A | 12/1999 | Lipo et al. |
| 6,236,580 B1 | 5/2001 | Aiello et al. |
| 6,337,804 B1 | 1/2002 | Kea et al. |
| 6,424,552 B1 | 7/2002 | Jacobson |
| 6,700,804 B1 | 3/2004 | Reichard |
| 6,795,323 B2 | 9/2004 | Tanaka et al. |
| 6,856,283 B2 | 2/2005 | Jacobson et al. |
| 6,873,138 B2 | 3/2005 | Jacobson |

(Continued)

OTHER PUBLICATIONS

Notification of Transmittal of the International Search Report and the Written Opinion of the International Searching Authority, or the Declaration, PCT/US2008/070108 dated Jun. 16, 2010, 5 pages.

(Continued)

*Primary Examiner* — Jeffrey L Sterrett
(74) *Attorney, Agent, or Firm* — Daly, Crowley, Mofford & Durkee, LLP

(57) ABSTRACT

A method of providing power to a load is provided. A first series resonant converter is provided. A second SRC is operably coupled to the first SRC in a cascade connected arrangement. First and second zero voltage switching (ZVS)-assistance networks are operably coupled between the first SRC and the second SRC, such that the first and second ZVS-assistance networks are providing first and second ZVS-assistant currents flowing from each ZVS-assistance network to the cascade connected arrangement of SRCs. Power from a power source is received at the cascade connected arrangement of first and second SRCs, power from a power source. The cascade connected arrangement of first and second SRCs supplies an output voltage to the load in response to receiving power from the power source.

20 Claims, 12 Drawing Sheets

U.S. PATENT DOCUMENTS

| | | | |
|---|---|---|---|
| 6,952,153 | B2 | 10/2005 | Jacobson et al. |
| 7,102,321 | B2 | 9/2006 | Edwards et al. |
| 7,145,268 | B2 | 12/2006 | Edwards et al. |
| 7,219,673 | B2 | 5/2007 | Lemak |
| 7,285,816 | B2 | 10/2007 | Bonanomi |
| 7,495,938 | B2 | 2/2009 | Wu et al. |
| 7,638,904 | B2 | 12/2009 | Shoji et al. |
| 2004/0125523 | A1 | 7/2004 | Edwards et al. |
| 2005/0111246 | A1 | 5/2005 | Lai et al. |
| 2005/0185430 | A1* | 8/2005 | Vinciarelli ............... 363/65 |
| 2005/0284673 | A1 | 12/2005 | Nakazawa et al. |
| 2008/0280175 | A1 | 11/2008 | Gurunathan et al. |
| 2009/0021081 | A1 | 1/2009 | Jacobson et al. |
| 2009/0021966 | A1* | 1/2009 | Jacobson et al. ........... 363/52 |
| 2010/0314937 | A1* | 12/2010 | Jacobson et al. ........... 307/18 |

OTHER PUBLICATIONS

Written Opinion of the International Searching Authority, PCT/US2008/070108 dated Jun. 16, 2010, 15 pages.

Notification Concerning Transmittal of International Preliminary Report on Patentability (Chapter 1 of the Patent Cooperation Treaty), PCT/US2008/070108 dated Jun. 24, 2010, 15 pages.

Jung-Won Kim et al.: "Modeling, Control, and Design of Input-Series-Output-Parallel-Connected Converter for High-speed-Train Power System", IEEE Transactions on Industrial Electronics, IEEE Service Center, Piscataway, NJ, USA, vol. 48, No. 3, Jun. 1, 2001, XP011023828, 9 pages.

Olivereira J.D.S. et al.: "A Lossless Commutation PWM Two Level Forward Converter Operating Like a Full-Bridge", Applied Power Electronics Conference and Exposition, 2000, APEC 2000. Fifteenth Annual IEEE, vol. 1, Feb. 6, 2000, 6 pages.

H. J. McCreary: "The Magnetic Cross Valve", AIEE Transactions of the American Institute of Electrical Engineers, vol. 70, No. 2, Jul. 1951, XP002584373, USA, DOI: 10.1109/T-AIEE.1951.5060643. Retrieved from the Internet: http://ieeexplore.ieee.org/stamp/stamp.jsp?tp=&arnumber=5060643>, 8 pages.

Krishnamurthy H.K. et al.,: "Building Block Converter Module for Universal (AC-DC, DC-AC, DC-DC) Fully Modular Power Conversion Architecture", Power Electronics Specialists Conference, 2007. PESC 2007. IEEE, IEEE, Piscataway, NJ, USA, Jun. 17, 2007, XP031218336, ISBN: 978-1-4244-0654-8, 7 pages.

Jian Wang, Longyun Kang, Binggang Cao and Daming Xu, Energy Complementary Control of a Distributed Power Generation System Based on Renewable Energy, Sep. 2004, pp. 136-140, IEEE 0-7803-8386.

Vijay Choudhary, Enrique Ledezma, Raja Ayyanar and Robert M. Button, Fault Tolerant Circuit Topology and Control Method for Input-Series and Output-Parallel Modular DC-DC Converters, Jan. 2008, pp. 402-411, IEEE Transactions on Power Electronics, vol. 23, No. 1, IEEE 0885-8993.

Boris S. Jacobson, et al., Methods and Apparatus for Frequency Three-Phase Inverter with Reduced Energy Storage, U.S. Appl. No. 11/936,896, filed Nov. 8, 2007.

Notification of Transmittal of the International Search Report and the Written Opinion of the International Searching Authority, or the Declaration, the International Search Report and the Written Opinion of the International Searching Authority, PCT/US2008/067083 dated Feb. 12, 2009, 24 pages.

Fang Zheng Peng et al: "A multilevel voltage-source converter system with balanced DC voltages", Power Electronics Specialists Conference, 1995. PESC '95 Record., 16$^{th}$ Annual IEEE Atlanta, GA, USA Jun. 18-22, 1995, New York, NY, USA, IEEE, US, vol. 2, Jun. 18, 1995, pp. 1144-1150, XP010150694. ISBN: 978-0-7803-2730-6, paragraph [II.A], table 1.

Shuai Lu et al: "Advanced Control and Analysis of Cascaded Multilevel Converters Based on P-Q Compensation" IEEE Transactions on Power Electronics, IEEE Service Center, Piscataway, NJ, US, vol. 22, No. 4, Jul. 1, 2007, pp. 1242-1252, XP011186930, ISSN: 0885-8993, paragraph [00II], figure 1, figure 5, figure 7 and figure 17.

Raju N R et al: "Harmonic cancellation for a twelve-pulse rectifier using DC bus modulation", Conference Record of the 2002 IEEE Industry Applications Conference. 37$^{th}$ IAS Annual Meeting. Pittsburgh, PA, Oct. 13-18, 2002; [Conference Record of the IEEE Industry Appliations Conference. IAS Annual Meeting], New York, NY: IEEE, US, vol. 4, Oct. 13, 2002, pp. 2526-2529, XP010609944, ISBN: 978-0-7803-7420-1, p. 2527, right-hand column, figure 4 and figure 6.

Notification Concerning Transmittal of International Preliminary Report on Patentability (Chapter 1 of the Patent Cooperation Treaty) dated Jan. 28, 2010, PCT/US2008/067083, 1 page.

International Preliminary Report of Patentability and Written Opinion (Chapter 1 of the Patent Cooperation Treaty) dated Jan. 19, 2010, PCT/US2008/067083, 13 pages.

File downloaded for U.S. Appl. No. 11/936,896, filed Nov. 8, 2007, file through Aug. 25, 2010, 243 pages.

Notice of Allowance dated Sep. 16, 2010 for U.S. Appl. No. 11/936,896, filed Nov. 8, 2007, 8 pages.

* cited by examiner

METHODS AND APPARATUS FOR A CASCADE CONVERTER USING SERIES RESONANT CELLS WITH ZERO VOLTAGE SWITCHING

CROSS REFERENCE TO RELATED APPLICATIONS

The present invention claims the benefit of U.S. Provisional Patent Application No. 60/950,130 filed on Jul. 17, 2007 and also claims the benefit of U.S. Provisional Patent Application No. 60/950,383, filed on Jul. 18, 2007, each of which is incorporated herein by reference. In addition, this application is related to U.S. Nonprovisional patent application Ser. No. 11/936,896, filed Nov. 8, 2007, the contents of which are hereby incorporated by reference. The present invention also is related to commonly assigned U.S. Pat. No. 6,873,138, issued Mar. 29, 2005, the contents of which are hereby incorporated by reference.

STATEMENT REGARDING FEDERALLY SPONSORED RESEARCH

The Government may have certain rights in the invention pursuant to contract number N00014-05-C-0202.

BACKGROUND

The invention relates generally to multilevel power conversion devices and more particularly to series resonant converters (SRCs) with clamped capacitor voltage and zero voltage switching (ZVS).

High voltage power conversion systems have many applications, including but not limited to military systems, transportation systems, manufacturing, electric power utilities, distributed power generation, electric power distribution, high voltage (HV) direct current (DC) transmission systems, and many other applications and industries familiar to those of skill in the art. Various methods can be used to attain a power conversion system having a high output voltage. One method is to use a multilevel power converter arrangement. The desired output voltage of the power conversion system is one factor that determines the number of levels a multilevel power converter might have, another factor is the type of switching devices the power converter uses, and still another factor is the category of converter used.

As is known in the art, multilevel converters belong to three broad categories: Diode-clamped converters; capacitor-clamped (flying capacitor) converters; and cascaded converters. Cascaded converters may be divided into converters with separate voltage sources (see, e.g., U.S. Pat. No. 6,005,788 to Lipo et al, U.S. Pat. No. 5,638,263 to Opal et al., and U.S. Pat. No. 5,625,545 to Hammond), and converters without separate voltage sources.

One problem associated with diode-clamped converters is voltage imbalance between series-connected DC bus capacitors and complicated control required for capacitors balancing. Another negative aspect of these converters is the unequal conduction time of switches. Diode-clamped converters also need clamping diodes with blocking voltage that increases with the number of levels. As the number of levels increases (e.g., beyond five levels), the diode-clamped converter topology can become unwieldy and difficult to realize.

Capacitor-clamped topologies rely on capacitors connected across transistors to limit their off-state voltage. Similarly to diode-clamped topologies, the capacitor voltages have to be regulated using complex switching algorithms for power semiconductors. Another disadvantage is that the flying capacitor converters require a significant number of large capacitors with voltage rating that increases with the number of levels. As with the diode-clamped converters, capacitor clamped inverters can be awkward and difficult to achieve beyond five levels.

Cascaded topologies use series connection of individual cell converters and do not need clamping diodes or capacitors. Converters with separate DC sources ensure inherent voltage balance across individual cells. However, since these converters require multiple, isolated DC sources (for example, via a separate line frequency transformer rated for full load power), their use is somewhat limited.

Cascaded converters without separate voltage sources (see e.g., T. A. Lipo et al, "Hybrid Topology for Multilevel Power Conversion", U.S. Pat. No. 6,005,788, Dec. 21, 1999) use a DC supply for one converter cell while the remaining sources are substituted by capacitors. Thus, the cell fed by the power supply processes the full load power while other cells improve the output voltage quality. This topology has different voltage levels across individual cells and needs to simultaneously control both capacitor voltages and the switching algorithm that forms the output voltage.

A modular, multilevel converter with a single power source that does not feature equal power distribution between individual cells is described in U.S. Pat. No. 6,236,580 to Aiello et al. Although this topology has a three-phase power source, it relies on single-phase power processing that leads to oversized DC filter capacitors inside cells. Also, because cell converters comprising this topology are connected in series on both sides of the isolation boundary, this approach does not guarantee equal power distribution between cells.

In general, known converters do not adequately address operation of fast semiconductors in high voltage (HV) switching environments that may generate a spurious turn-on. This effect results from the combination of HV and high frequency (HF) that subjects transistors in a bridge circuit to high dV/dt. The rapid voltage change produces large parasitic currents internal to semiconductors during hard switching events such as reverse recovery of the MOSFET body diode and turn-on of one transistor in a bridge leg. These transients might cause simultaneous conduction of transistors connected across the input bus (cross-conduction) resulting in failures of HV, HF converters, as shown in the prior art configuration of FIG. 1.

FIG. 2 illustrates, for a prior art converter a cross-conduction observed in hard-switching converters at a low input voltage of 270 VDC that will be more pronounced in high voltage converters. Active pull-down gate drive circuits and reduced internal gate resistance can alleviate this problem, but they do not address its root cause.

A power converter comprising two power cells with inherent power balance between the individual cells is disclosed into the aforementioned U.S. Pat. No. 6,873,138, which has been incorporated herein by reference. In addition to equal power sharing between the individual cells, the power converter of the '138 patent utilizes zero voltage switching (ZVS), which makes it well-suited for high voltage, high frequency switching environments. The two power cells in this converter are connected in parallel via a compensation circuit to form a dual clamped-mode series resonant converter (SRC). In such a converter, ZVS can be obtained for a full range of output load conditions and results in robust, reliable operation. However, parallel connection of the power cells is a limiting factor in high voltage applications.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

In one aspect, at least some embodiments of the invention use a dual series resonant converter (SRC) that operates with zero voltage switching (ZVS) under all load conditions, to help eliminate some or all of the faults that may arise by spurious gate turn-on (e.g., the cross-conduction shown in the prior art FIG. 2).

In another aspect, the invention provides a circuit and a method for cascade connection of SRCs with Zero-Voltage Switching (ZVS) assistance networks. In still another embodiment of this aspect, the invention provides multi-cell topologies using cascade connected SRCs with ZVS assistance networks.

In at least one embodiment of this aspect, the circuit for the ZVS assistance networks has controllable impedance. In a further embodiment of this aspect, the SRC with ZVS assistance networks has controllable impedance. In still another embodiment, the invention provides a ZVS assistance network, with controllable impedance that is usable with many different types of circuits, including but not limited to cascade connected SRC's with ZVS assistance networks and converters having phase shift control. In still another embodiment of this aspect, the invention provides multi-cell topologies using SRC's and/or other circuits having a ZVS assistance network with a controllable impedance.

In still another aspect, the invention provides a circuit and a method for voltage balancing across series-connected converters feeding different loads. The circuit and method of this aspect is usable with many different types of circuits, including but not limited to cascade connected SRC's with ZVS assistance networks and converters having phase shift control. In another embodiment of this aspect, the invention provides multi-cell topologies using the methods and circuit for voltage balancing across series-connected converters feeding different loads.

In a first aspect, the invention provides a method of providing power to a load. A first series resonant converter is provided. A second SRC is operably coupled to the first SRC in a cascade connected arrangement. First and second zero voltage switching (ZVS)-assistance networks are operably coupled between the first SRC and the second SRC, such that the first and second ZVS-assistance networks are providing first and second ZVS-assistant currents flowing from each ZVS-assistance network to the cascade connected arrangement of SRCs. Power from a power source is received at the cascade connected arrangement of first and second SRCs, power from a power source. The cascade connected arrangement of first and second SRCs supplies an output voltage to the load in response to receiving power from the power source.

In one embodiment of this aspect, each ZVS-assistance network further comprises a respective controllable inductor, and the method further comprises changing the inductance value of the respective controllable inductor if the current flowing through the respective ZVS-assistance network deviates from a predetermined value.

In an additional embodiments, the value of at least one of the first and second ZVS assistance currents is adjusted if the value of the ZVS assistance current deviates from a predetermined reference current value, such as one or more current values that ensure proper ZVS operation and/or the lowest level of current in the respective ZVS-assistance network sufficient for ZVS operation of all switching elements in the respective SRC. In further embodiments, each of the first and second ZVS assistance networks further comprises a controllable inductor, and wherein the method further comprises changing the value of the inductance of at least one of the controllable inductors when the at least one of the ZVS-assistance currents deviates from a values that ensure proper ZVS operation.

In another aspect, the invention provides a dual power converter, comprising first and second series resonant converters (SRCs) and first and second zero voltage switching (ZVS) networks. The first series resonant converter (SRC) is operably coupled to the second SRC in a cascade connected arrangement. The first and second zero voltage switching (ZVS)-assistance networks are operably coupled between the first and second SRCs.

In one embodiment, the dual power converter further comprises a first sensor comparing a current flowing through the first ZVS-assistance network to the first and second SRCs, a second sensor comparing a current flowing through the second ZVS-assistance network to the first and second SRCs, and a controller in operable communication with the first and second sensors and the first and second ZVS assistance networks, the controller being operable to change the value of the current flowing through at least one of the first and second ZVS assistance networks to at least one of the first and second SRCs if the current deviates from a predetermined value. In a further embodiment, each of the first and second ZVS-assistance networks comprises a controllable inductor, and wherein the controller is operable to change the value of at least one of the first and second controllable inductors if the current flowing throughout least one of the first and second ZVS-assistance networks deviates from a predetermined value.

In a still further embodiment of this aspect, each respective SRC further comprises at least one respective switching element, and wherein the predetermined value comprises the lowest level of current flowing through the ZVS-assistance networks sufficient for ZVS operation of all switching elements in the SRCs. In yet another embodiment, the controller is operable to change the value of the inductance of the controllable inductor in at least one of the first and second ZVS assistance networks when the current flowing through at least one of the first and second ZVS-assistance networks deviates from a value that ensure proper ZVS operation. In still further embodiments, the output each SRC can be coupled to a rectifier, such as one of a one-quadrant, two-quadrant, and four-quadrant rectifier.

In still another aspect, the invention provides a method of balancing the voltage between first and second series resonant converter (SRC) cells connected in series to a common high voltage (HV) input, where the first and second SRC cells are configured such that they do not share the same load. At least one variable signal from the first SRC cell is sensed, wherein the variable signal comprises at least one signal selected from the group consisting of input voltage, input current, output voltage, and output current. Based on the value of the sensed variable signal, at least one respective AC/DC converter is activated, where the AC/DC converter is coupled to the output of the first respective SRC cell. The output of the first activated AC/DC converter associated with the first SRC cell is coupled so as to increase the power at a DC output of the second SRC cell. The input voltage value of at least one of the first and second SRC cells is changed so as to restore the input voltage balance between the first and second SRC cells.

In further embodiments, the output of the first activated AC/DC converter associated with the first SRC cell is coupled so as to be in parallel with the DC output of the second SRC cell. In still more embodiments, the output of the first activated AC/DC converter associated with the first SRC cell is coupled so as to be in parallel with the DC output of the second SRC cell.

In yet another aspect, the invention provides a voltage balancing circuit, comprising first and second SRC cells and a controller. The first SRC cell comprises an input, a DC output, and a first AC/DC converter connected in parallel with the output of the first SRC cell, the first AC/DC converter having an output. The second SRC cell is operably coupled in series with the first SRC cell, the second SRC cell comprising an input, a DC output, and a second respective power exchange circuit that includes a second respective AC/DC converter connected in parallel with the output of the second SRC cell, where the second AC/DC converter has a DC output, wherein the output of the first AC/DC converter is operably coupled so as to be parallel with the DC output of the second SRC cell, and the output of the second AC/DC converter is operably coupled so as to be in parallel with the DC output of the first SRC cell. The controller is in operable communication with the first and second SRC cells, and the controller is configured to: sense at least one variable signal from each respective SRC cell, wherein the variable signal comprises at least one signal selected from the group consisting of input voltage, input current, output voltage, and output current; and activate, based on the value of the sensed variable signal, at least one of the first and second AC/DC converters coupled to the output of a respective SRC cell, wherein the activated AC/DC converter operates so as to change the input voltage value of the respective SRC cell to which its output is connected, wherein the changing of the input voltage value restores an input voltage balance between the first and second SRC cells.

In still another aspect, the invention provides a multi-cell power converter, comprising a plurality of groups of cells and a controller. Each group of cells is operably coupled to a common input voltage source and is constructed and arranged to be capable of providing power to a respective load. Each group of cells comprises: a plurality of dual power converter cells connected in series, each power converter cell including a ZVS assistance network and being operably coupled to a respective transformer via a respective set of primary windings; and an output rectifier portion, wherein each respective power converter cell in the plurality of power converter cells is coupled to the output rectifier portion via a respective set of secondary windings on each respective transformer, wherein each respective set of secondary windings is connected in parallel; and The controller is in operable communication with at least a portion of the plurality of groups of cells. The controller provides regulation for each respective load connected to each respective group with which the controller is in operable communication, wherein the controller receives a set of power-related signals from each group with which it is in operable communication and, based at least in part on at least one of the power-related signals in the set, provides a corresponding control signal to the respective group.

In some embodiments of this aspect, at least a portion of the power converter cells comprise dual SRC cells, such as dual SRC cells that comprise a first series resonant converter (SRC) operably coupled to a second SRC in a cascade connected arrangement; first and second zero voltage switching (ZVS)-assistance networks operably coupled in parallel between the first and second SRCs; a first sensor comparing a current flowing through the first ZVS-assistance network to the first and second SRCs; a second sensor comparing a current flowing through the second ZVS-assistance network to the first and second SRCs; and a cell controller in operable communication with the first and second sensors and the first and second ZVS assistance networks, the controller being operable to change the value of the current flowing throughout least one of the first and second ZVS assistance networks to at least one of the first and second SRCs if the current deviates from a predetermined value. In some embodiments, the ZVS assistance network comprises a controllable inductor, and wherein the cell controller is operable to change the value of at least one of the respective first and second controllable inductors if the current flowing from at least one of the first and second ZVS-assistance networks deviates from a value that ensures proper ZVS operation.

In still further embodiments of this aspect, at least a portion of the dual power converter cells includes a dual SRC cell comprising first and second SRC cells and a cell controller. The first SRC cell comprises an input, a DC output, and a first AC/DC converter connected in parallel with the output of the first SRC cell, the first AC/DC converter having an output. The second SRC is operably coupled in series with the first SRC cell, and the second SRC cell comprises an input, a DC output, and a second respective power exchange circuit that includes a second respective AC/DC converter connected in parallel with the output of the second SRC cell. The second AC/DC converter has a DC output, wherein the output of the first AC/DC converter is operably coupled so as to be parallel with the DC output of the second SRC cell, and the output of the second AC/DC converter is operably coupled so as to be in parallel with the DC output of the first SRC cell. The SRC cell controller is in operable communication with the first and second SRC cells, and the SRC cell controller is configured to: sense at least one variable signal from each respective SRC cell, wherein the variable signal comprises at least one signal selected from the group consisting of input voltage, input current, output voltage, and output current; and activate, based on the value of the sensed variable signal, at least one of the first and second AC/DC converters coupled to the output of a respective SRC cell, wherein the activated AC/DC converter operates so as to change the input voltage value of the respective SRC cell to which its output is connected. The changing of the input voltage value restores an input voltage balance between the first and second SRC cells.

In a still further embodiment, the invention provides a method of providing power to multiple loads from a single voltage source. A plurality of power converter cells are connected in series to form a plurality of groups of cells, wherein each power converter cell in each group is associated with a ZVS assistance network and is operably coupled to a respective transformer via a respective set of primary windings, and wherein each group of cells is operably coupled to a common input voltage source. Each respective power converter cell in the group is operably coupled to an output rectifier portion via a respective set of secondary windings on each respective transformer, wherein each respective set of secondary windings is connected in parallel. At least a portion of the power-related signals in the group (e.g., at least one of a voltage signal, a current signal, and a power signal) are sampled. Each respective load operably coupled to each respective group is regulated based at least in part on the sampled power related signals.

Details relating to these and other embodiments of the invention are described more fully herein.

BRIEF DESCRIPTION OF THE DRAWINGS

The foregoing features of this invention, as well as the invention itself, may be more fully understood from the following description of the drawings in which:

FIG. 1 is a schematic depiction of a prior art circuit configuration showing spurious switch turn on;

In the drawings, like reference numbers indicate like elements. The drawings are not necessarily to scale, emphasis instead generally being placed upon illustrating the principles of the invention.

DETAILED DESCRIPTION

In one aspect, the invention provides a high power DC/DC conversion topology operating from a single high voltage (HV) source using a building block comprising a dual series resonant converter (SRC) with clamped capacitor voltage. Exemplary embodiments include a power topology using multiple power stages with Zero-Voltage Switching (ZVS) operation at any practical load. This topology also ensures equal input voltage and power sharing between individual converters. The inventive power cell provides enhanced reliability and efficiency compared with conventional circuits. In one embodiment, the invention builds on and improves the ZVS topology described in the commonly assigned, related, and incorporated-by-reference U.S. Pat. Nos. 6,873,138 6,873,139.

Figure 1:
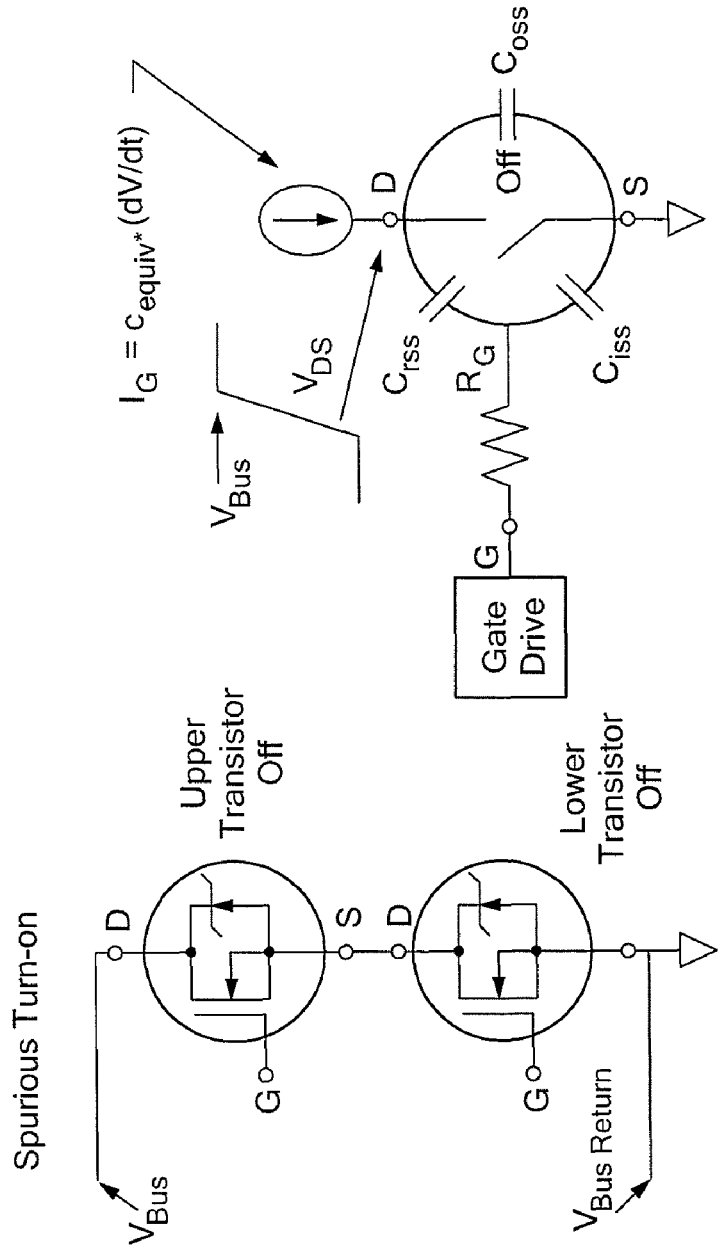
Figure 2:
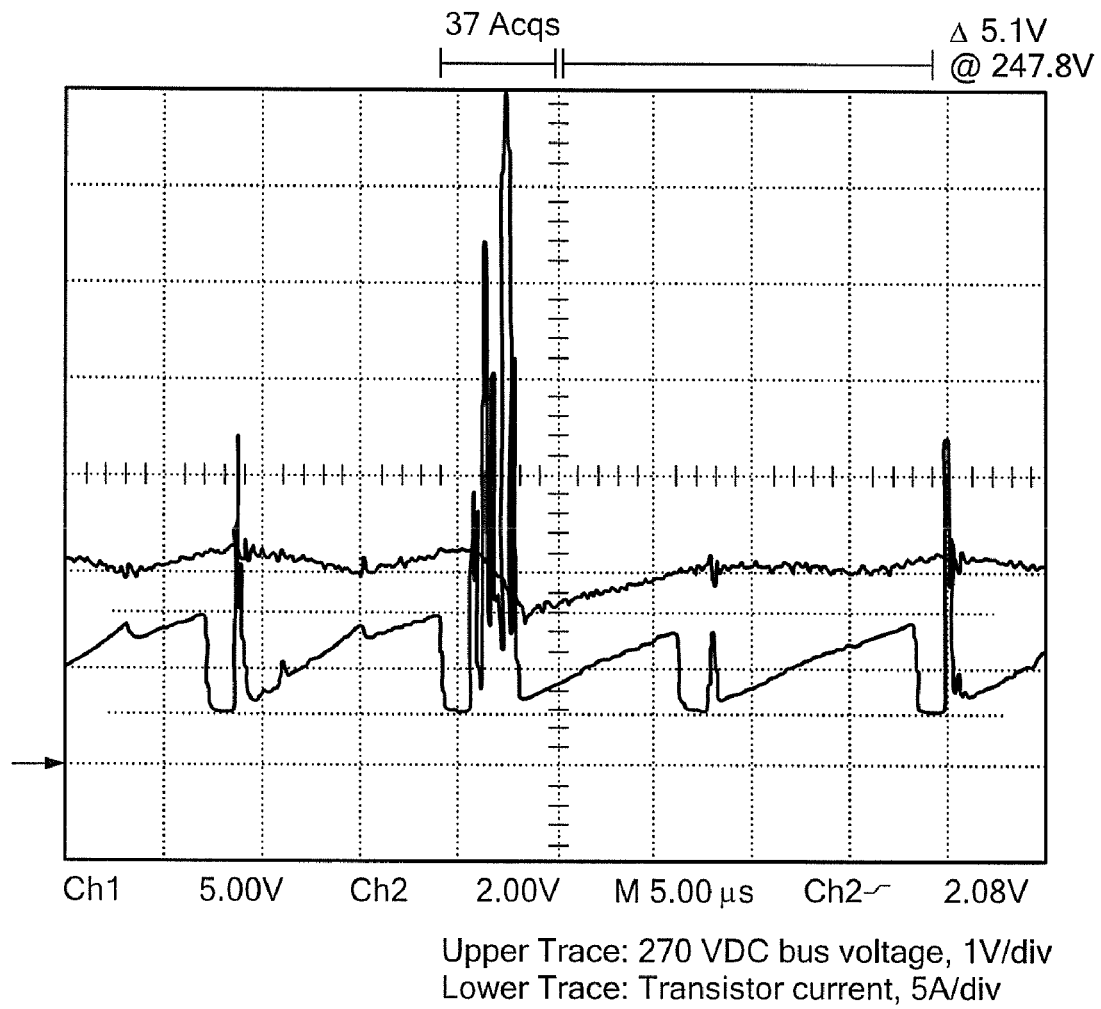
FIG. 2 is a graphical depiction of cross-conduction in a prior art circuit configuration.
Figure 3A:
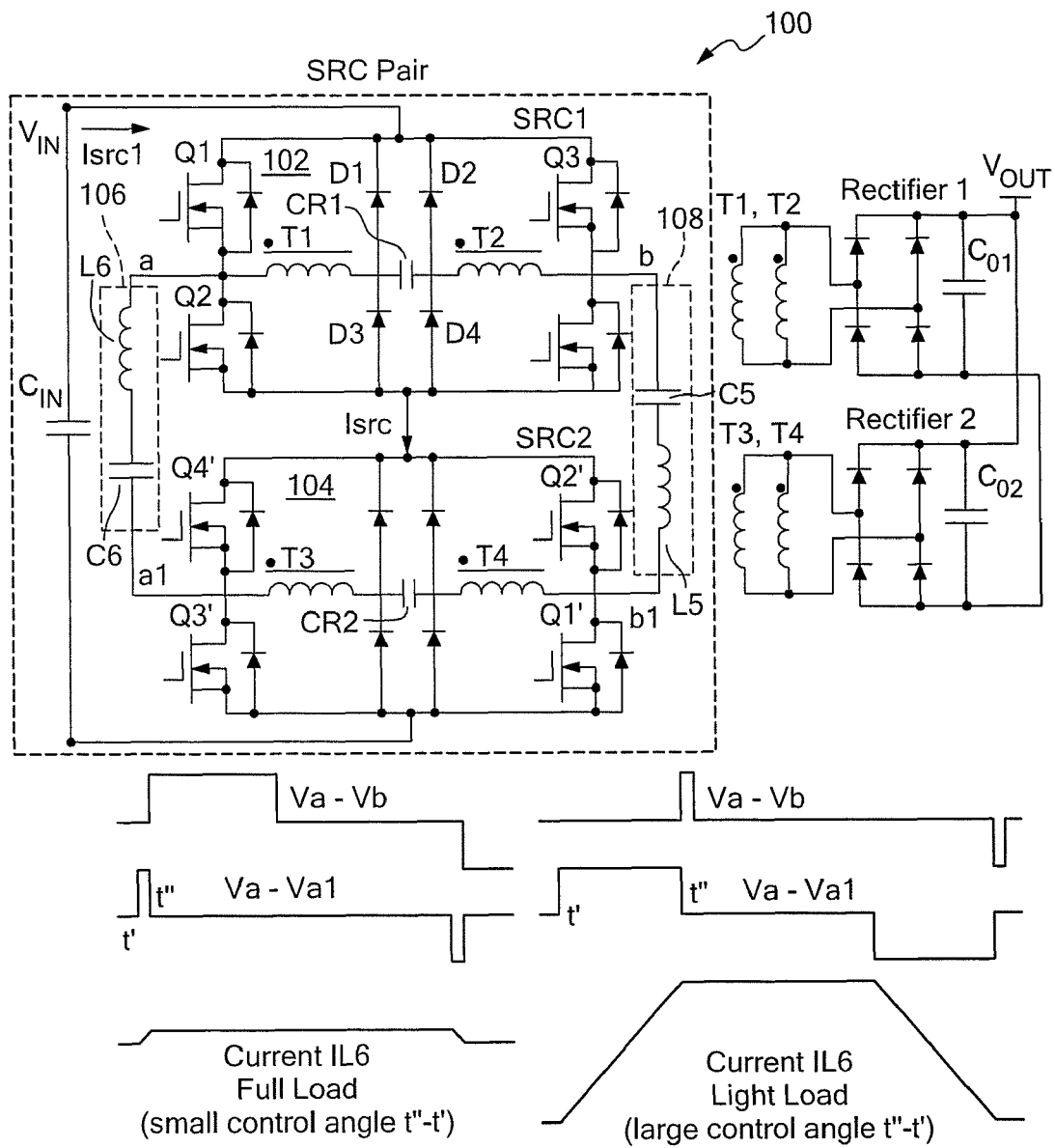
FIG. 3A is a schematic representation of a dual SRC-based power cell, in accordance with one embodiment of the invention.

FIG. 3A shows an exemplary dual SRC power cell 100 in accordance with exemplary embodiments of the invention. The power cell 100 has ZVS under all, or substantially all, expected load and line conditions thereby reducing switching losses and enhancing device and circuit level reliability. The ZVS also reduces dv/dt stress of the switching elements thereby lowering common-mode currents. Furthermore, the cascade connection of dual SRC converters combines ZVS with passive input voltage and power sharing between individual cells thus further improving reliability of the overall converter.

The SRC power cell 100 includes first and second cascade-connected SRCs 102, 104 and first and second ZVS assistance networks 106, 108 comprising auxiliary inductors L5, L6 and blocking capacitors C5, C6. This dual SRC power cell 100 is connected to a single voltage source $V_{IN}$, and a capacitor $C_{IN}$ also is connected across the input to the dual SRC cell 100. The first SRC 102 includes four diodes D1-4 coupled in a full bridge configuration with corresponding switching elements Q1-Q4. A series path extends from a point between the first and second switching elements Q1, Q2 to a point between the third and fourth switching elements Q3, Q4 and includes a first resonant capacitor CR1 between primary windings of first and second transformers T1, T2. Similarly, the second SRC 104 includes switching elements Q1'-Q4' and a second resonant capacitor CR2 between third and fourth transformer T3, T4 primary windings. Transistor Q1' is controlled by the same phase angle as Q1, transistor Q2' has the same control angle as Q2, transistor Q3' is controlled by the same phase angle as Q3, and transistor Q4' has the same control angle as Q4.

Thus, similarly to the aforementioned incorporated-by-reference '138 patent, an external controller (not shown in FIG. 3A but see, e.g., FIG. 3C, 7A and the '138 patent) for the SRC cells 102, 104 can generate a set of control signals for one of the SRC cells 102, 104 and also use the same control signals for the other cell. Those of skill in the art will be familiar with the various types of controllers that can be implemented to generate the required control signals. The controller can be analog and/or digital in its operation. For example, in one embodiment, the controller is implemented using discrete components. In another embodiment, an integrated circuit device (e.g., a microcontroller, microprocessor, digital signal processor, etc.) is programmed to generate the required waveforms. In one embodiment, the controller is provided as a phase shift controller. Generally, any component or combination of components (including systems and/or software programs that emulate, simulate, or provide some or all of the functions of the components) that is capable of generating the required control signals can be viewed as (and used as) a controller, in the various embodiments of the invention.

Secondary windings for the first and second transformers T1, T2 are coupled in parallel for connection to a first rectifier Rectifier1. Secondary windings for the third and fourth transformers T3, T4 are coupled in parallel for connection to a second rectifier Rectifier2. The output voltage $V_{OUT}$ is provided by the first and second rectifiers. Depending on the load, the circuit of FIG. 3A may use either a one-quadrant (unidirectional), two-quadrant (bipolar or bidirectional), or a four-quadrant (bipolar, bidirectional) rectifier.

Figure 3B:
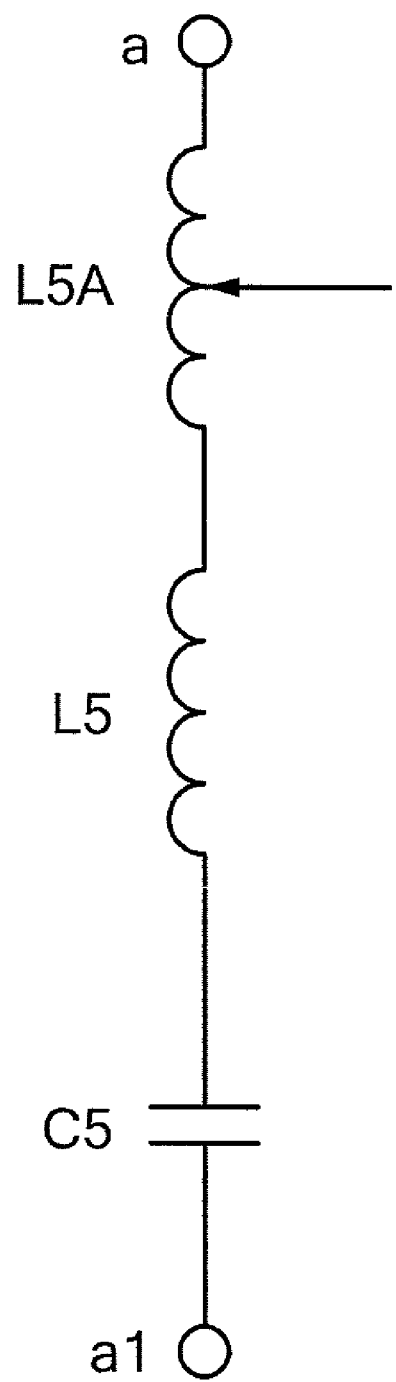
FIG. 3B is a schematic representation of a Zero Voltage Switching (ZVS) network with controllable impedance, in accordance with one embodiment of the invention.
Figure 3C:
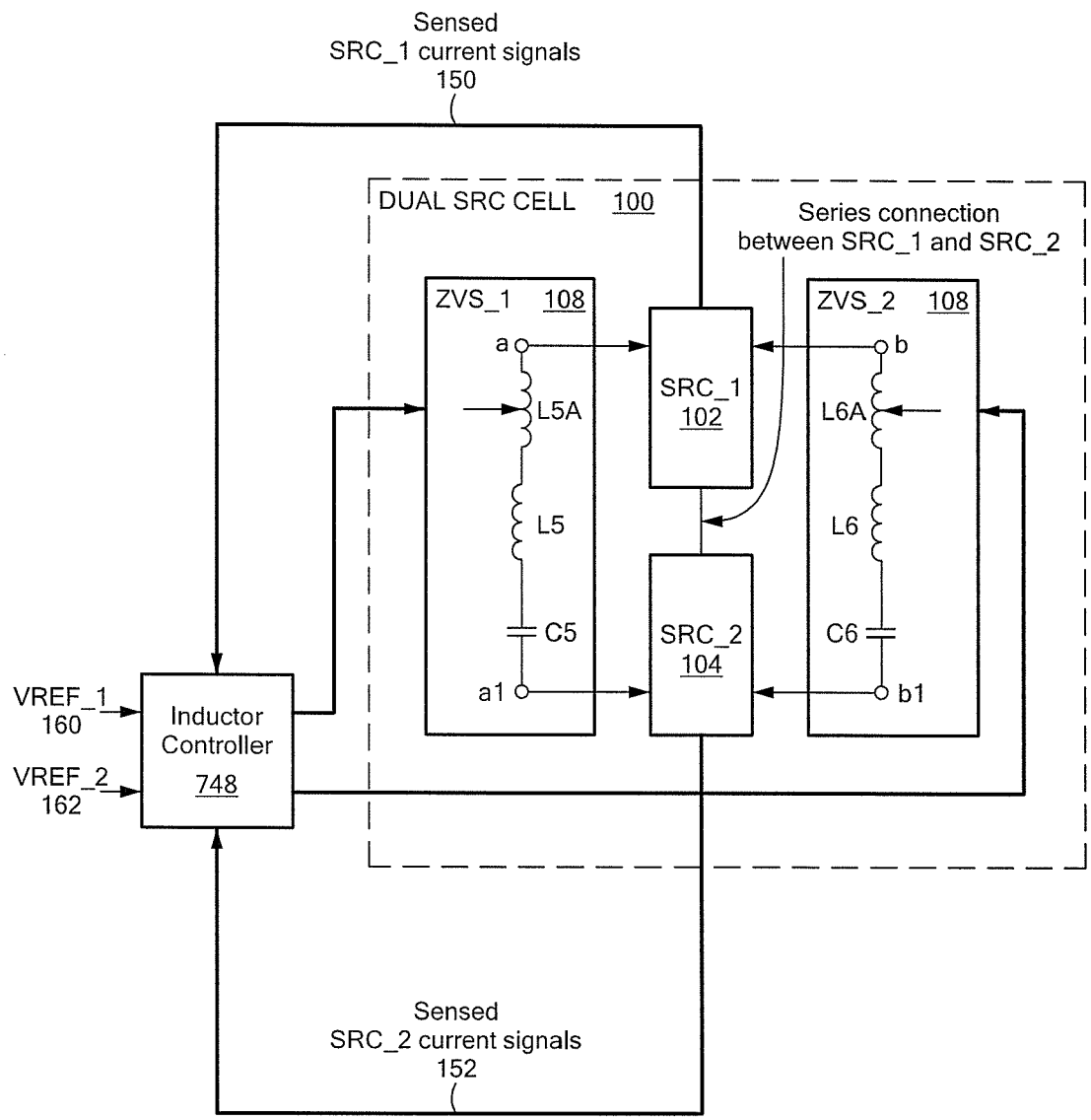
FIG. 3C is a block diagram illustrating use of the ZVS network of FIG. 3B in a system that includes the dual SRC based power cell of FIG. 3A.

While the SRC cell 100 of FIGS. 3A-3C is shown as having two sets of parallel-connected secondary windings and two separate rectifiers, it is understood that this SRC cell 100 can operate with various combinations of parallel-connected secondary windings and rectifiers including, but not limited to, a single common rectifier for one or more cells. In addition to the illustrated one-quadrant (unidirectional) rectifier, the dual SRC cell 100 can operate with other rectifier types including two-quadrant (bipolar or bidirectional) and four-quadrant (bipolar, bidirectional) circuits.

Figure 4:
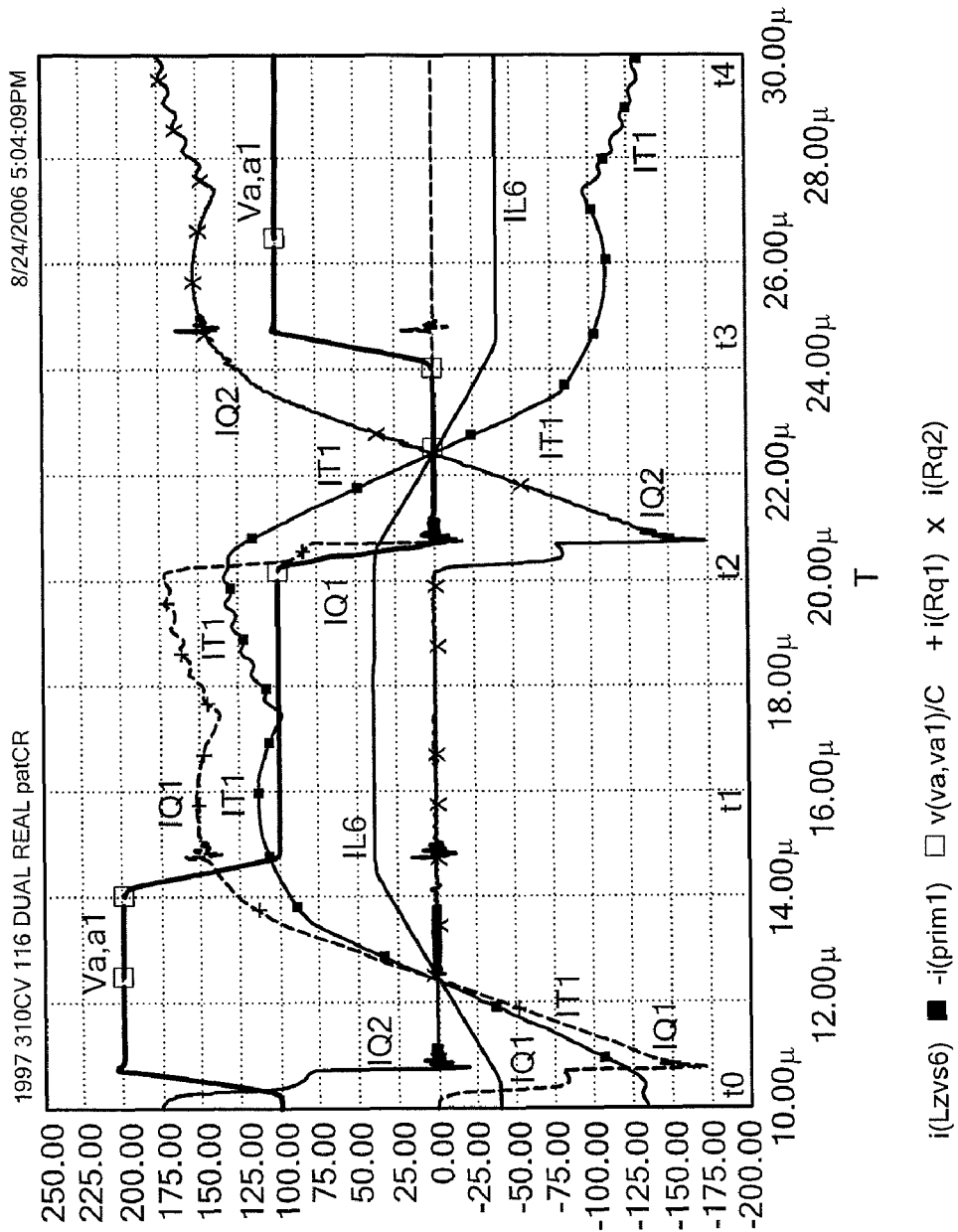
FIG. 4 is a graphical depiction of power cell waveforms.
Figure 5:
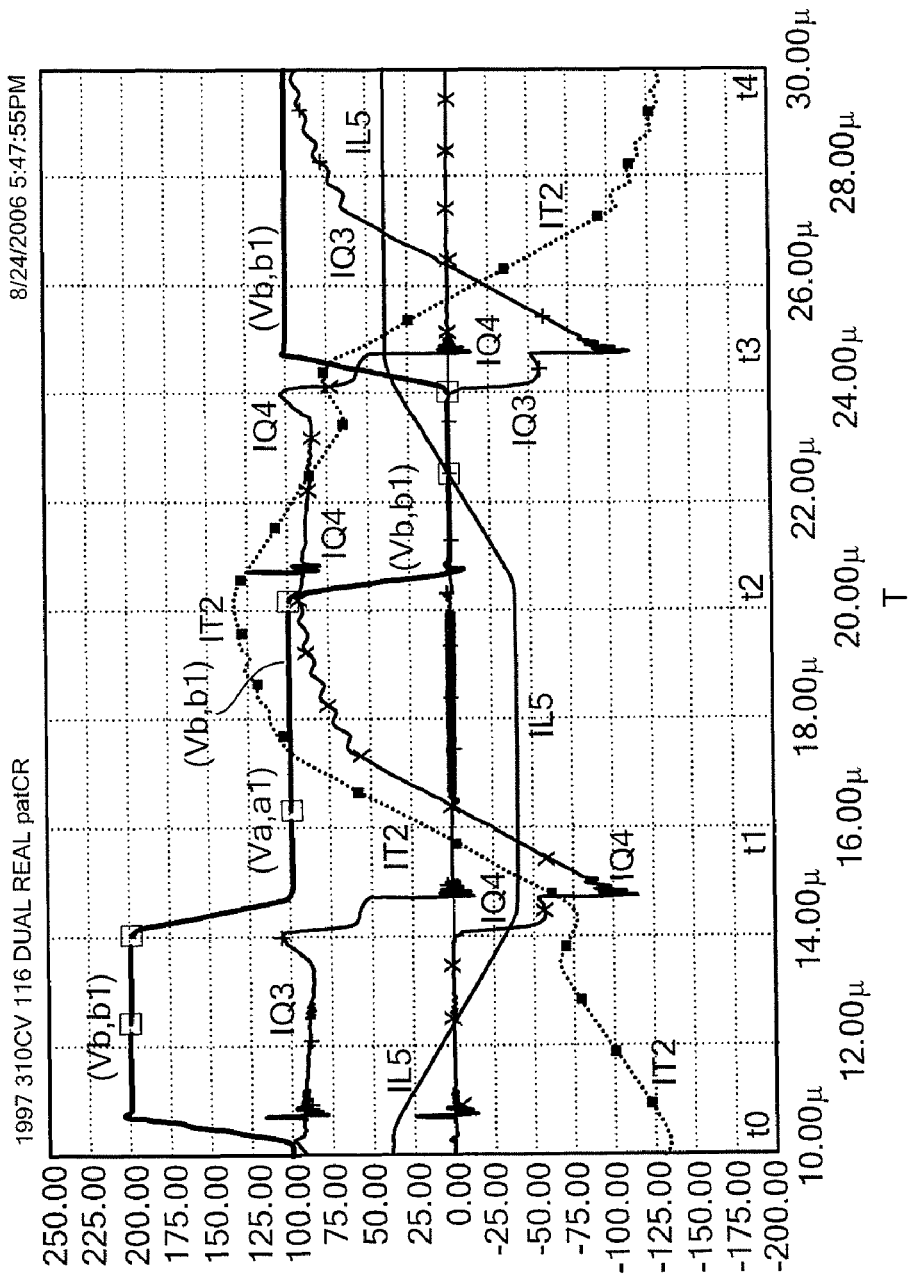
FIG. 5 is a graphical depiction of further power cell waveforms.
Figure 6:
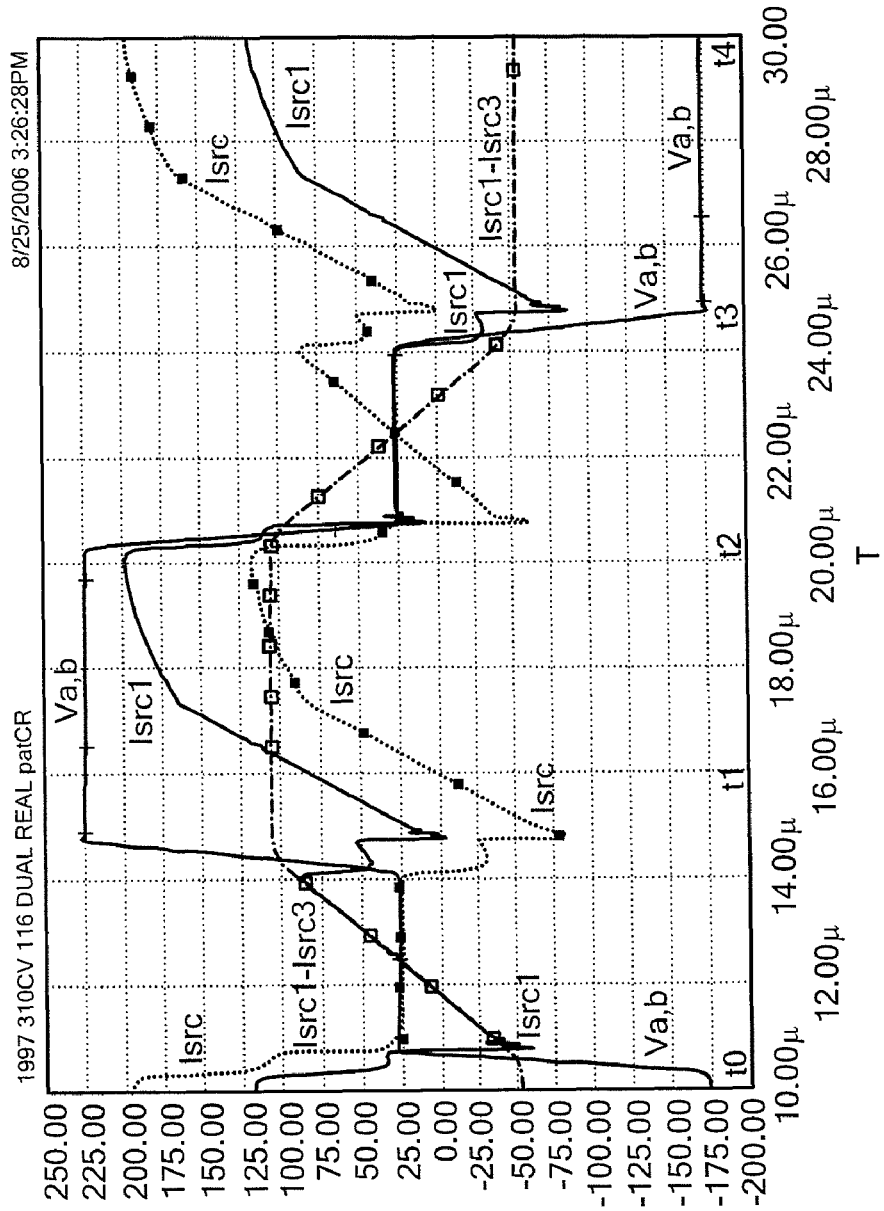
FIG. 6 is a graphical depiction of further power cell waveforms.

As shown in FIGS. 4-6, at the beginning of the cycle at time t0, switching element Q1 (which can, for example be a transistor, such as the illustrated field effect transistor (FET)) turns on, switching element Q2 turns off, switching element Q4 is off, and switching element Q3 is on. The sum of the currents IT1 and IL6 charges the output capacitance (Coss) of Q2 and discharges the output capacitance of Q1, and the voltage across both ZVS-assistance networks 106, 108 stats increasing from 0.5 Vd to Vd. At t1, switching element Q3 turns off, Q4 turns on, switching element Q2 is off, and switching element Q1 is on. The sum of the currents IT2 and IL5 charges the output capacitance (Coss) of Q3 and discharges the output capacitance of Q4 and the voltage across both ZVS-assistance networks 106, 108 starts reducing from Vd to 0.5 Vd.

At time t2, switching element Q1 turns off, switching element Q2 turns on, switching element Q3 is off, and switching element Q4 is on. The sum of the currents IT1 and IL6 charges the output capacitance (Coss) of Q1 and discharges the output capacitance of Q2 and the voltage across both ZVS-assistance networks starts 106, 108 reducing from 0.5 Vd to zero. At time t3, switching element Q3 turns on, switching element Q4 turns off, switching element Q1 is off, and switching element Q2 is on. The sum of the currents IT2 and IL5 charges the output capacitance (Coss) of Q4 and discharges the output capacitance of Q3 and the voltage across both ZVS-assistance networks 106, 108 starts increasing from zero to 0.5 Vd. The time interval from t3 to t4 completes the switching period.

In contrast to known topology arrangements, such as some of the topologies described in the aforementioned U.S. Pat. No. 6,873,138 patent, voltage Vbb1 across the ZVS-assistance network 108 has a DC component that equals one-half of the input voltage (FIG. 5). Blocking capacitor C5 holds this voltage while the AC component of the voltage is applied to the ZVS-assistance inductor L5. The ZVS-assistance networks 106, 108 each generate reactive current at the switching frequency fs while circulating currents produced by the dual SRC exchange energy with the DC source $V_{IN}$ at 2 fs. Thus, the DC source for the dual SRC cell 100 has two major current and voltage ripple components: one at the fundamental frequency fs and the other at the second harmonic of fs. Assuming ideal components and identical timing for gate signals applied to the pairs of switches Q1 and Q1', Q2 and Q2', Q3 and Q3', and Q4 and Q4', current flowing in or out of the node connecting the two SRCs equals substantially zero. However, considering parasitic inductance of wiring, practical circuits will include small decoupling capacitors CHF (not shown) for each SRC bridge comprising the cell 100, as those of skill in the art will appreciate.

This arrangement of FIG. 3A provides equal distribution of voltages and throughput power between individual SRCs. Within the limits of tolerances for passive components (e.g., transformer leakage inductance, resonant capacitance, and ZVS-assistance inductance) currents that flow through pairs of switching elements Q1 and Q1', Q2 and Q2', Q3 and Q3', and Q4 and Q4' and through the ZVS assistance networks 106, 108 are essentially the same. Because the primary winding currents of transformers T1, T3, and T2, T4 are equal to the difference between switching element and ZVS-assistance network 106, 108 currents, transformer T1 primary current IT1 is fundamentally the same as transformer T3 primary current IT3-1 and current IT2 is fundamentally the same as IT4. Thus, the dual SRC configuration of FIG. 3 provides the equivalent to a series connection of the transformer winding pairs. Because the secondary windings of these transformers are connected in parallel, the inventive dual SRC cell 100 ensures equal voltage and processed power division between individual converters in contrast to conventional cascade topologies that do not ensure intrinsically equal power distribution between converter cells.

The inventive topology of this embodiment also alleviates excessive circulating currents by automatically adjusting the ZVS-assistance currents 15 and 16. Because the highest auxiliary current corresponds to the minimum load, and the minimum (close to zero) currents correspond to full load, this topology combines effective noise reduction with high efficiency. Such regulation does not use closed loop feedback control, but rather, relies on the inherently stable feed-forward that allows immediate response to changes in input line and load.

In another aspect of the invention, further reduction of circulating currents is provided by controllable/adjustable inductors L5A and L6A in series, respectively with the ZVS assistance inductors L5 and L6. FIG. 3B is a schematic representation of a Zero Voltage Switching (ZVS) network with controllable impedance in the form of a controllable inductor, in accordance with one embodiment of the invention. FIG. 3C is a block diagram illustrating use of the ZVS network of FIG. 3B in a system that includes the dual SRC based power cell 100 of FIG. 3A and a controller capable of sending signals that change the controllable/adjustable inductors L5A and L6A. For simplicity, the source and output voltages are not illustrated in FIG. 3C. Referring to FIGS. 3A, 3B, and 3C, exemplary embodiments to realize circulating current reduction includes the main inductors L5 and L6, the controllable inductors L5A and L6A, current sensors for one or two switching elements of the SRC (Q4 or Q1 and Q4) generating sensed SRC current signals 150, 152, reference voltages 160, 162 each corresponding to the $V_{IN}$ to each bridge pair (i.e., Q1, Q2, Q3, Q4 forming bridge 1 and Q1', Q2', Q3', and Q4' forming bridge 2).

Note that the current sensors that generate sensed SRC current signals 150, 152 can be implemented via a single sensor or multiple sensors, as will be appreciated by those of skill in the art. In addition, the respective reference voltage 160, 162 correspond to the lowest current in the respective ZVS-assistance network 106, 108 sufficient for the ZVS operation of all SRC switching elements (e.g., transistors Q1-Q4 and Q1'-Q4'). A closed-loop feedback controller 750 compares the reference voltages 160, 162 (corresponding to the lowest current necessary for ZVS operation of bridge pairs 1 and 2) and the sensed SRC current signals 150, 152. In one embodiment, when a ZVS-assistance current exceeds the set minimum value (based at least in part on the sensed ZVS currents 150, 152), the controller 748 changes (e.g., increases) the value of one or both of the controllable inductors L5A, L6A, thereby changes (e.g., reduces) reactive currents circulating between the dual SRC cell 100 and its source.

In another embodiment, when the ZVS-assistance current deviates from a predetermined value (e.g., a value that ensures that ZVS conditions exist in the SRC cell 100—i.e., that all SRC switching elements have ZVS operation), the controller 748 changes the value of one or both of the controllable inductors L5A, L6A, to change the reactive currents circulating between the dual SRC cell 100 and its source, so as to restore ZVS conditions.

The controllable inductors L5A, L6A of FIGS. 3B and 3C can be implemented by any known method. For example, in one embodiment, the controllable inductor is implemented as described in H. J. McCreary, "The Magnetic Cross Valve," AIEE Transactions, Vol. 70, Part II, 1951, pp. 1868-1875 and in U.S. Pat. No. 2,703,368 to McCreary, entitled "The Magnetic Cross Valve." Each of these references is incorporated by reference. Of course, those of skill in the art will appreciate that other electrically and/or mechanically controlled inductors are also usable In another aspect, the invention provides systems, methods, and circuits for correction of voltage balance between cells feeding different loads. Consider a converter that has multiple dual SRC cells connected in series to a common high voltage input source, where the SRC cells do not share the same load. Ordinarily, in such a configuration, the voltage distribution among the SRC cells will be unequal. However, in accordance with embodiments of this aspect of the invention, the voltage balancing circuit, as described herein, helps to restore the voltage balance by providing a means of power exchange between the individual cells.

Figure 7A:
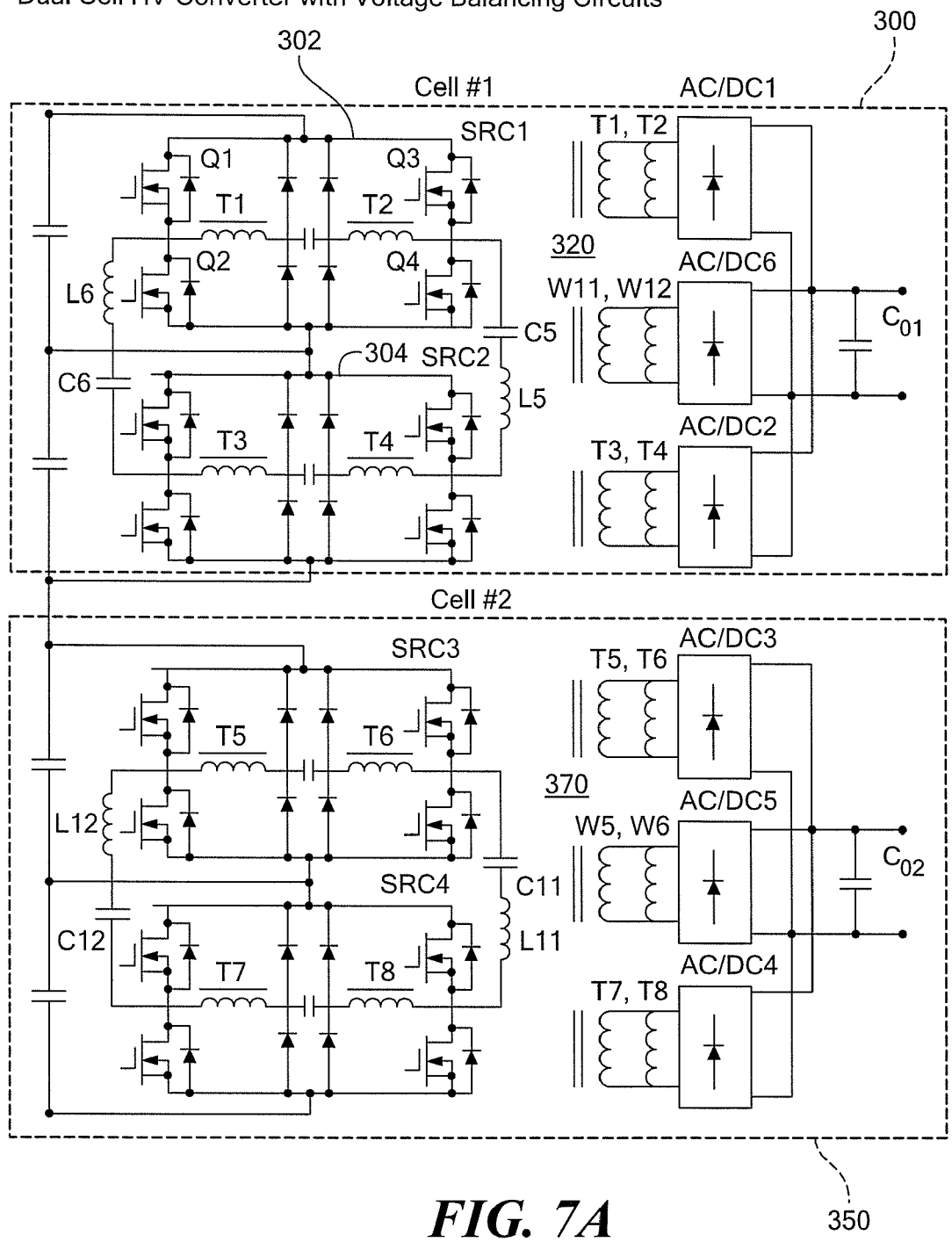
FIG. 7A is a schematic representation of a power cell having load balancing.
Figure 7B:
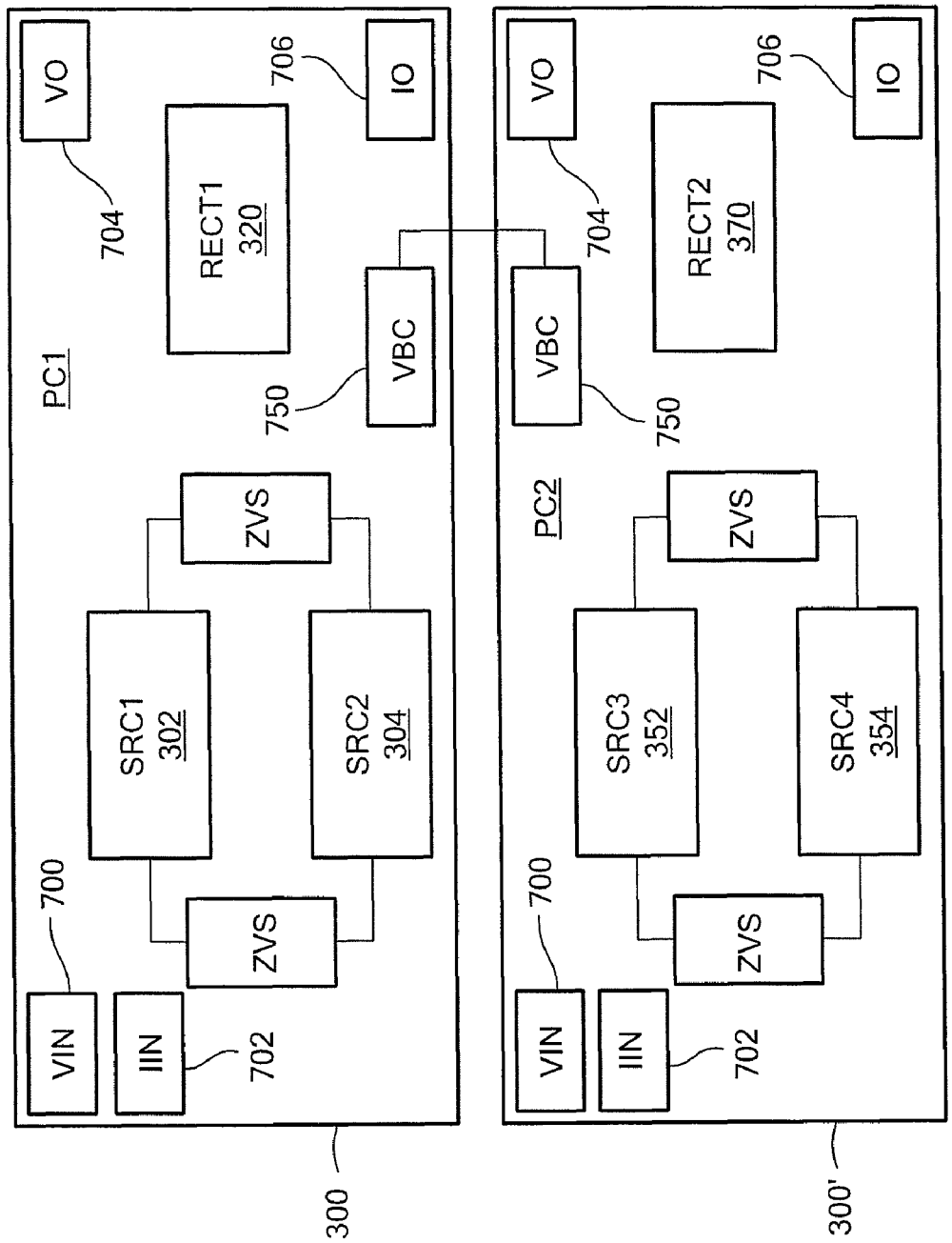
FIG. 7B is a schematic block diagram of a power cell having a voltage balance controller.

FIG. 7A and 7B show illustrative embodiments of this aspect of the invention, with a voltage balancing circuit that provides the ability to equalize voltages across multiple cells connected in series to a common input voltage source and feeding different loads. Referring to FIG. 7A, in accordance with exemplary embodiments of the invention, a first dual SRC power cell 300 is coupled to a second dual power cell 350 with load balancing. The first power cell 300 includes first and second SRCs 302, 304 and the second power cell includes first and second SRCs 352, 354. Note that the cells 300, 350 are similar to the dual SRC cell 100 of FIG. 3 with the addition of voltage balancing.

In an exemplary embodiment, a first rectifier 320 (e.g., an AC/DC converter) includes parallel-coupled windings W11, W12 that are inductively coupled with respective inductors L11, L12 foiling a part of the ZVS assistance networks in the second cell 350. Similarly, the second rectifier 370 (e.g., an AC/DC converter) includes parallel-coupled windings W5, W6 that are inductively coupled with respective inductors L5, L6 of the ZVS assistance networks of the first cell 300. The output of the first rectifier 320 is connected in parallel to the output of the first cell 300 and the output of the second rectifier 370 is connected in parallel to the output of the second cell 350. This arrangement provides a means of power exchange between the individual cells 300, 350 to equalize voltages across multiple cells connected in series and feeding different loads.

Referring to FIG. 7B, a closed-loop voltage balancing controller 750 common to first and second dual SRC power cells PC1, PC2 comprises a sensing network that senses variables for both cells. The variables include (but are not limited to) SRC cell input voltage, SRC cell input current, SRC cell output voltage, and SRC cell output current. FIG. 7B shows a series of sensors 700, 702, 704, 706, (for clarity, their connections are not shown) to sense these variables. In FIG. 7B, sensor 700 measures measure cell input voltage, sensor 702 measures cell input current, sensor 704 measures cell output voltage, sensor 706 measures cell output current. Although not illustrated in FIG. 7B, sensors also could be provided to sense currents through the ZVS assistance networks (e.g., described in connection with FIGS. 3A-3C), as will be appreciated by those of skill in the art. The sensors 700, 702, 704, 706 provide information to the voltage balancing controller 750. Additional sensors may be used to provide information about other circuit variables to meet the needs of a particular application. In addition, it is possible to achieve voltage balancing between the cells if only one variable is sensed. The controller 750 receives the sense signals and activates the appropriate rectifier to restore the input voltage balance between the cells PC1, PC2.

Note that the voltage balancing controller 750 OF FIG. 7B has a control functionality that is separate (i.e., different control signals) from the controller functionality described in connection with inductor controller 748 of FIG. 3C. Those of skill in the art will appreciate, however, that a common component or set of components could be used to provide both control signals. Of course, both controllers can be implemented separately.

Referring again to FIGS. 7A and 7B, consider the exemplary embodiments of FIGS. 7A and 7B, where there are dual SRC cells connected in series. Under initial conditions, the two cells PC1, PC2 have equal loads and their input voltages are equal as well. If the first cell PC1 gets a load increase that does not exceed the total power capacity of the input source, the first cell PC1's share of the input voltage will increase and the input voltages will be unbalanced while both cells PC1, PC2 still consume the same input current. To help correct this situation, the controller 750 senses the input voltage unbalance and activates the second cell PC2's rectifier 370 (e.g., AC/DC converter) that is connected to the output of the first cell. The rectifier 370 (e.g., AC/DC converter) effectively allows the second cell PC2 to share the load with the first cell, thereby reducing the input voltage to the first cell PC1 input voltage and thereby restoring the input voltage balance between PC1 and PC2.

In one implementation, the voltage balancing circuit of FIGS. 7A and 7B operates in the hysteretic mode with integral cycle control for lower switching losses and higher efficiency. The converter intrinsic impedance combined with electronic protection provides a two-tier overload limit that simplifies protection of downstream low voltage systems.

Figure 8:
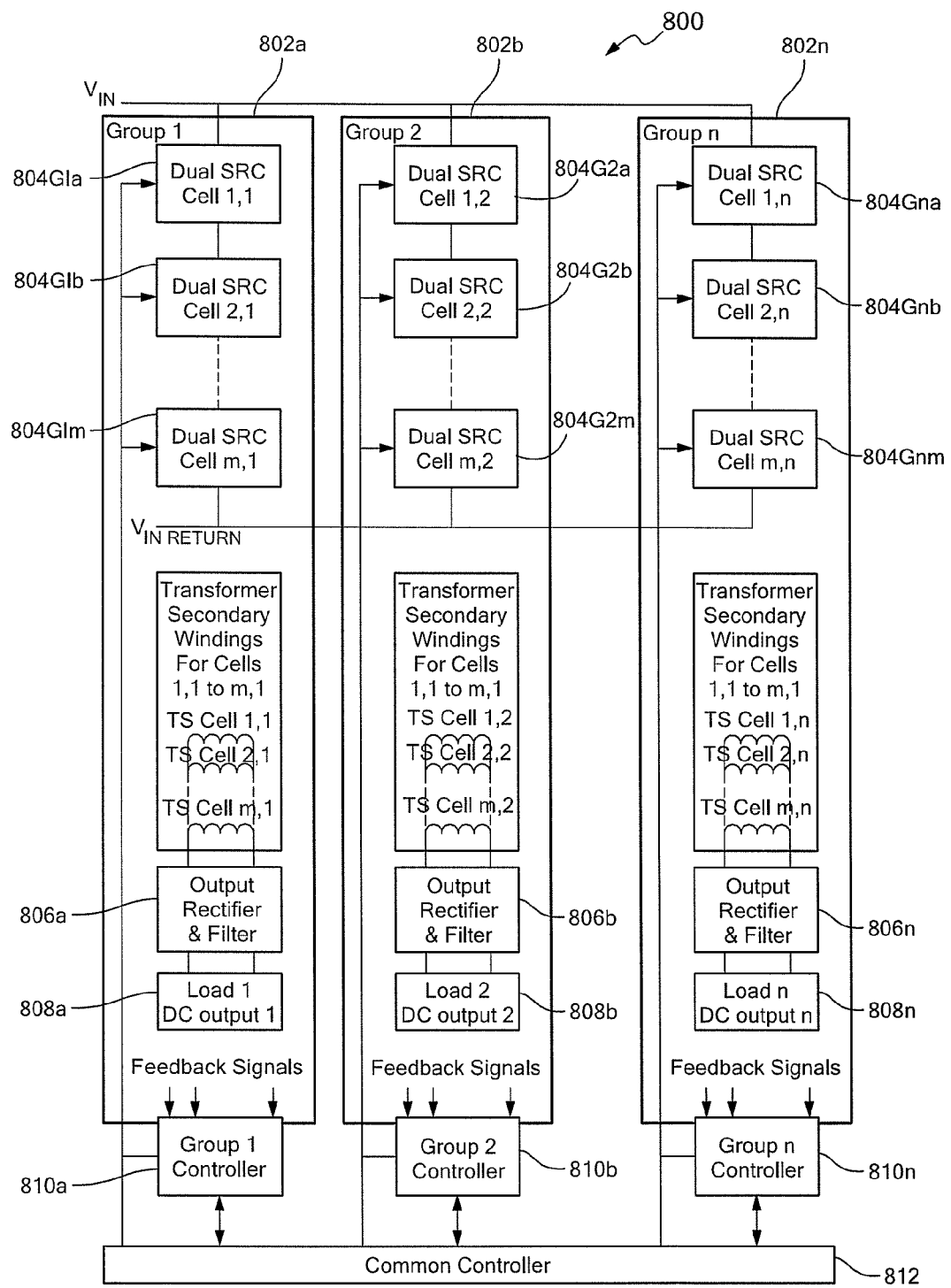
FIG. 8 is a block diagram of a cascade connected multi-cell power circuit.

In accordance with still another aspect of the invention, any or all of the SRC with ZVS cell topologies described herein (e.g., the voltage balancing topologies of FIGS. 7A and 7B, the controllable inductance topologies of FIGS. 3B, 3C, the equal distribution of voltages and throughput power between individual power cells topology of FIG. 3, the ZVS under all load and line conditions topology of FIG. 3, etc.) can be used as a "building block" to help construct a converter having multiple cells fed by a single source. For example, FIG. 8 shows a DC/DC multi-cell circuit 800 fed by a single regulated or unregulated HV DC source $V_{IN}$. The multi-cell circuit 800 can provide distributed power generation. Note also that, in addition to the proposed cascade-connected SRC cell, the multi-cell topology may be implemented using other converter cell topologies.

Referring now to FIG. 8, the multi-cell topology 800 is comprised of several groups 802, each group 802 including a respective set or "stack" (e.g., a vertical stack) of power converter cells 804 coupled via respective transformer windings to a respective output rectifier and filter 806. There are separate transformers (not shown in FIG. 8) for each power converter cell 804. In addition, in the illustrated embodiment of FIG. 8, the power converter cells are shown as being dual series resonant converter cells (e.g., as illustrated in FIG. 3A), but it should be understood that the invention is not limited to implementations with this particular type (SRC) of power converter cell. As those of skill in the art will appreciate, other types of power converter cells are usable. Advantageously, in at least one embodiment, the power converter cells 804 include cells that implement a zero-voltage-switching (ZVS), as described herein.

Referring again to FIG. 8, each group 802 (stack) of power converter cells 804a-804m in this embodiment is coupled to its respective transformer with parallel windings, as shown in FIG. 8, effectively providing a set of rectifiers in parallel, such that each respective power converter cell 804 in the group 802 sees the "same" rectifier. In some embodiments of the invention, the power converter cells 804 are all coupled to a single rectifier 806. In other embodiments of the invention, the power converter cells 804 can be coupled to multiple rectifiers. Note that the arrangement of primary and secondary transformer windings is essentially the same as shown in FIG. 3A, except that the group of series connected power converter cells 804 feeds a single output rectifier and filter 806a Additionally, each respective group 802 provides power to a respective load 808 and also provides feedback signals to a respective group controller 810. Each group controller 810 is in further communication with a common controller 812 and respective load 808. The common controller 812 interfaces with each group 802a, 802b, 802n (also referred to as a "vertical stack".)

In particular, the exemplary multi-cell topology 800 of FIG. 8 comprises M*n=k cells organized in n groups 802a-802n with each group having m series-connected cells 804G1a-804Gnm. To further explain the labeling and arrangement of FIG. 8, consider the illustrative group of power converter cells that form "Group 1" (which itself has reference designation 802a). This group includes (for illustrative purposes) a first respective dual SRC Cell 804G1a (i.e., dual SRC cell 804, from Group 1 ("G1"), location "a"), a second dual SRC cell 802G1b, and so on. Each cell supports a voltage Vcell that equals to a fraction of the input voltage $V_{IN}$. Vcell is defined as: Vcell=$V_{IN}$/m. In terms of the semiconductor blocking voltage Vb, Vcell=VDF*Vb, where VDF is the voltage derating factor (VDF<1). Thus, the semiconductor blocking voltage is defined as: Vb=$V_{IN}$/2mVDF. One of skill in the art will be familiar with voltage derating factors applicable to a given electrical components, based on relevant derating conditions (e.g., environmental conditions like temperature, airflow, shock, humidity, etc.). For example, for a typical semiconductor, the voltage derating factor is a percentage (e.g., fifty percent) of the collector breakdown voltage. For example, in one embodiment, the voltage derating factor ranges from 0.6 to 0.8.

Provided a sufficiently low VDF is selected to allow operating after the loss of a dual SRC cell, the inventive topology may implement a failed cell bypass method to improve reliability. For example, one failed cell bypass implementation usable with at least some embodiments of this aspect of the invention involves, for cells connected in series, forming a current path so as to bypass a failed cell. Those of skill in the art will be familiar with methods for implementing failed cell bypass, such as the methods described in U.S. Pat. No. 5,986,909, which is incorporated by reference herein.

Referring again to FIG. 8, a single secondary winding represents four secondary windings, TScellm,n, connected in parallel for each power converter cell 804. As mentioned previously, the multi-cell DC/DC converter topology 800 has n rectifier and filter units 806a-n feeding n separate loads 808a-n corresponding to the number of n groups of series-connected cells. Depending on the load, the multi-cell topology 800 may use either a one-quadrant (unidirectional), two-quadrant (bipolar or bidirectional), or a four-quadrant (bipolar, bidirectional) rectifier. As described previously, parallel connection of transformer secondary windings of all m cells 804 in any group 802 ensures equal power sharing between individual cells 804. In a further embodiment, a common controller 812 may incorporate n individual closed-loop group controllers 810a-n for every group of cells (i.e., each group controller 810 associated with a respective group 802 of cells 804.)

In the illustrated embodiment of FIG. 8, each group controller 810 receives feedback signals from the group 802 of cells 804, the feedback signals including, as a minimum, one or more power-related signals, including but not limited to voltage, current, and power signals. Based at least in part on the feedback signals, each group controller 810 provides regulation for the respective common load 808 connected to the respective group 802. The regulation may include output voltage, current, and power. In an exemplary embodiment, the group controller 808 uses a Phase-Shift Modulation (PSM) algorithm that is selected as the most suitable for the dual SRC cells 804 in the group 802. Other suitable control techniques and/or algorithms will be readily apparent to one of ordinary skill in the art. It also should be understood that, instead of using the group controllers 810, the common controller 812 could provide all the functionality of the group controllers.

The approach of the example embodiment of FIG. 8 is different from multi-cell converters that use parallel connection of multiple resonant inverters that drive the primary winding of the isolation transformer. Also, because such other multi-cell converter topologies with parallel connection of multiple resonant inverters have one common transformer, their cells are not self-contained.

In a further embodiment of the invention, the inventive voltage balancing circuit (VBC) described above can be implemented so as to allow supplying independent loads from a series-connected string of cells. In this further embodiment, cells feeding independent loads have separate controllers. As an example of this embodiment, consider a DC/DC power converter system similar to that of FIG. 8, having three series-connected cells, where set of series connected cells is used to provide power to a vehicle, such as a car or a train. In this example, the group 1 cell 802a in the series drives a load that comprises a motor, the group 2 cell 802b in the series drives a load that comprises a fuel cell, and the group 3 cell 803c in the series drives a load that comprises additional electrical systems in the vehicle (alternator, starter, radios, cellular phones, rear window defrosters, electric door locks, etc.). Those of skill in the art will, of course, recognize that many other examples and implementations are possible.

Figure 9:
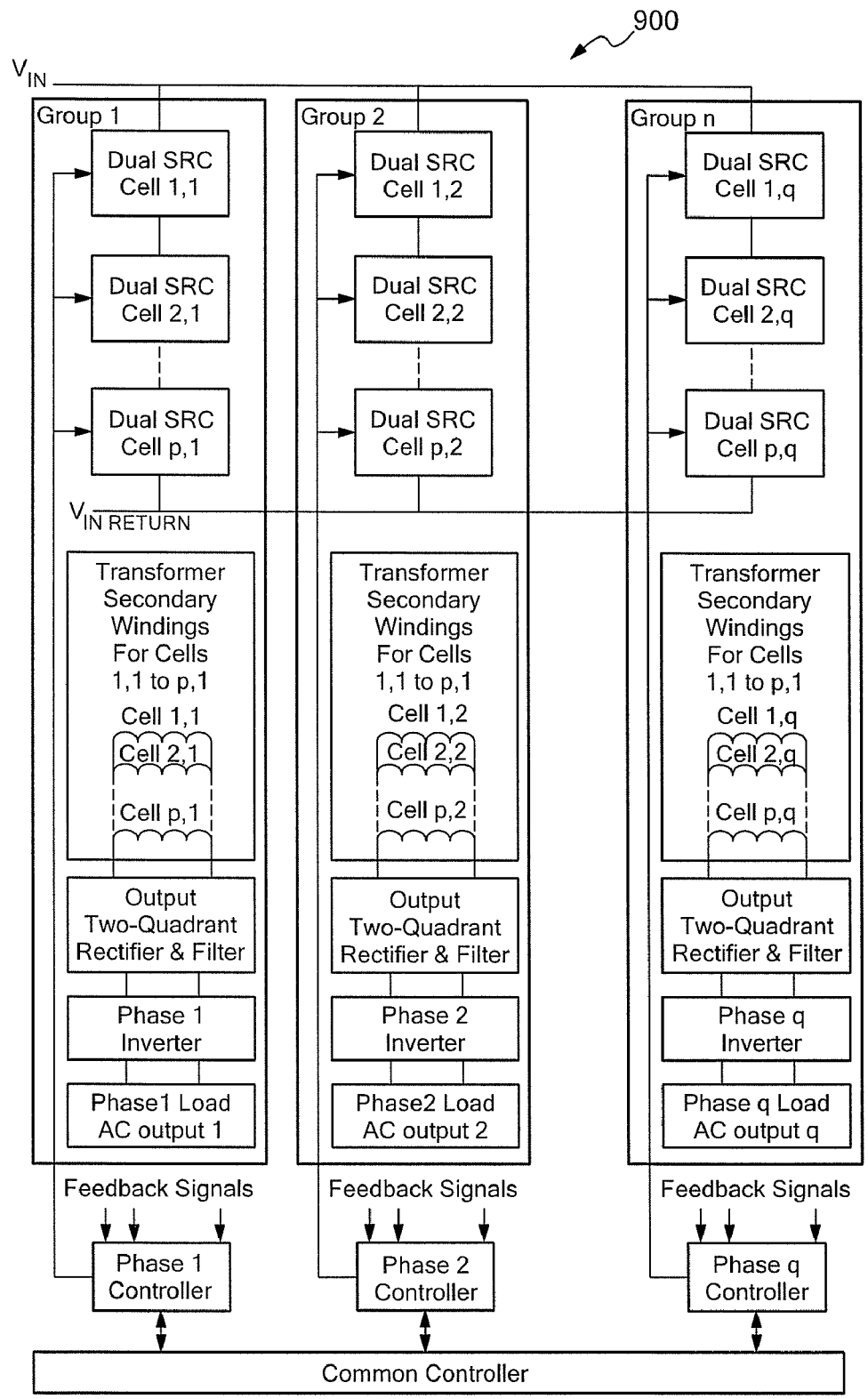
FIG. 9 is a block diagram of a DC/AC multi-cell power circuit.

In yet another aspect of the invention, the topology of FIG. 8 can be adapted and implemented for power converters having AC outputs and/or multi-phased outputs. For example, FIG. 9 shows a DC/AC multi-cell topology 900 fed by a single HV DC source for a q-phase output. Generally, the DC/AC multi-cell topology 900 of FIG. 9 is similar to that of FIG. 8., and the descriptions of the particular elements of FIG. 8 are applicable also to the topology 900 of FIG. 9.

Similarly to the multi-cell DC/DC converter 800 of the embodiment of FIG. 8, the DC source $V_{IN}$ of FIG. 9 may be regulated or unregulated and the multi-cell topology may be implemented using any or all of the SRC topologies described herein and/or with other power converter cell topologies, especially power converter cells that include ZVS. For a q-phase output, the multi-cell topology comprises p*q=r cells organized in q phases with each phase having p series-connected cells. Similarly to the DC/DC topology of FIG. 8, the semiconductor blocking voltage is defined as: Vb=$V_{IN}$/2pVDF.

Referring to FIG. 9, a single secondary winding represents four secondary windings connected in parallel for each dual SRC cell. The multi-cell inverter topology feeds q separate 1-phase loads corresponding to the number of q groups of series-connected cells. As described above, parallel connection of transformer secondary windings for each phase in all p cells in any phase ensures equal power sharing between individual cells. Each output phase has a bi-directional (two-quadrant) rectifier that allows operation with reactive loads. Each rectifier is fed by the parallel-connected secondary windings of all cells in the group. For example, each rectifier includes an output low-pass filter that feeds its respective low frequency LF inverter. The inverter may be implemented as a single-phase bridge, but other circuit configurations are possible. Depending on the load, the circuit of FIG. 3A may use either a one-quadrant (unidirectional), two-quadrant (bipolar or bidirectional), or a four-quadrant (bipolar, bidirectional) rectifier. For example, a four-quadrant rectifier may incorporate an inverter.

A common controller may include q individual controllers for every output phase. Each individual controller includes HF modulators (one modulator per each output phase). The controller may use either naturally-sampled pulse-width modulation (PWM) to generate phase control signals for the SRCs or any other method. Each controller receives feedback signals including voltage, current, and power signals from all cells comprising the phase and provides regulation for the common load connected to this phase.

In a further embodiment of the invention, similarly to the DC/DC converter topology described previously, the voltage balancing circuit (VBC) for the DC/AC converter of FIG. 9 can be implemented so as to also allow supplying independent loads from a serious-connected string of cells. In this embodiment, cells feeding independent loads have separate controllers.

The DC/AC converter topology 900 of FIG. 9 employs HF modulation of the dual SRCs to generate low frequency outputs. The following example illustrates one-phase (single phase) working principles. The controller generates a triangular carrier waveform that has frequency fc=2 fs where fs is the SRC switching frequency. The carrier waveform is compared to the reference waveform Vref expressed as:

$$Vref = A * \cos(\omega_0 t + \phi)$$

where A is reference voltage amplitude, $\omega_0$ is output voltage angular frequency, and $\phi$ output voltage phase shift.

The reference voltage is compared to the carrier waveform to produce a pulse-width modulated voltage ($V_{PWM}$). The pulse width of the $V_{PWM}$ equals to the phase-shift angle of the phase-shift modulated (PSM) signal that controls the dual SRC. The controller processes $V_{PWM}$ to create fixed width pulses at fs that drive SRC power semiconductors. Dual SRCs generate AC currents at fixed frequency fs and apply it to the primary windings of power transformers. These currents are summed up on the secondary side of the isolation boundary (e.g., at the transformer secondary windings of FIG. 9). The summary current feeds the HF bidirectional AC/DC converter that generates a rectified HF current. At the output of the HF rectifier, the capacitive filter produces a rectified LF waveform modulated by the reference sinusoidal voltage generated by the controller. Finally, the LF inverter recreates the desired sinusoidal output voltage.

It follows that the LF inverter does not use either HF switching or energy storage on the secondary side. Instead, it relies on rectified and filtered sine waves provided by the SRCs that perform HF power processing. Moreover, the four-quadrant capability of the SRC allows power exchange between the HV DC capacitors on the primary side and reactive loads. Because the individual phases are isolated it may provide any output connection (Y or Delta). If each SRC has at least two additional pairs of secondary windings, this topology may provide voltages phase-shifted with respect to the original set of q phases without an increase in the number of SRC cells, as may be required using other techniques.

In contrast to at least some of the exemplary embodiments of the invention described herein, some known topologies need separate voltage sources for individual cells and do not have individual HF transformers. For example, some cascaded inverter topologies do not provide an isolated output. Also, as opposed to the common control parameter applied to all series connected cells, some other known topologies and circuits use phase staggered control.

It is envisioned that the embodiment of FIG. 9 also could be combined with the technologies described in the commonly assigned U.S. patent application entitled "Methods And Apparatus For Three-Phase Inverter With Reduced Energy Storage," having application Ser. No. 11/936,896, filed Nov. 8, 2007, the contents of which are hereby incorporated by reference.

Throughout the present disclosure, absent a clear indication to the contrary from the context, it should be understood individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the invention must comprise more than one of that element, nor is it intended by illustrating a single element that the invention is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing the embodiments of the invention illustrated in the figures, specific terminology (e.g., language, phrases, etc.) may be used for the sake of clarity. These names are provided by way of example only and are not limiting. The invention is not limited to the specific technology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, processes, military programs, etc. Such terminology used herein, however, is for the purpose of description and not limitation.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention. Those of ordinary skill in the art will appreciate that the embodiments of the invention described herein can be modified to accommodate and/or comply with changes and improvements in the applicable technology and standards referred to herein. Variations, modifications, and other implementations of what is described herein can occur to those of ordinary skill in the art without departing from the spirit and the scope of the invention as claimed.

The particular combinations of elements and features in the above-detailed embodiments are exemplary only; the interchanging and substitution of these teachings with other teachings in this and the referenced patents/applications are also expressly contemplated. As those skilled in the art will recognize, variations, modifications, and other implementations of what is described herein can occur to those of ordinary skill in the art without departing from the spirit and the scope of the invention as claimed. The technology disclosed herein can be used in combination with other technologies. Accordingly, the foregoing description is by way of example only and is not intended as limiting. In addition, all publications and references cited herein are expressly incorporated herein by reference in their entirety.

Having described and illustrated the principles of the technology with reference to specific implementations, it will be recognized that the technology can be implemented in many other, different, form is, and in many different environments. Having described the preferred embodiments of the invention, it will now become apparent to one of ordinary skill in the art that other embodiments incorporating their concepts may be used. These embodiments should not be limited to the disclosed embodiments, but rather should be limited only by the spirit and scope of the appended claims. The invention's scope is defined in the following claims and the equivalents thereto.

What is claimed is:

1. A method of providing power to a load, the method comprising the unordered steps of:
   providing a first series resonant converter (SRC);
   operably coupling a second SRC to the first SRC in a cascade connected arrangement;
   operably coupling first and second zero voltage switching (ZVS)-assistance networks between the first SRC and the second SRC, the first and second ZVS-assistance networks providing first and second ZVS-assistant currents flowing from each ZVS-assistance network to the cascade connected arrangement of SRCs;
   receiving, at the cascade connected arrangement of first and second SRCs, power from a power source; and
   supplying, from the cascade connected arrangement of first and second SRCs, an output voltage to the load in response to receiving power from the power source.

2. The method of claim 1, further comprising the unordered step of adjusting the value of at least one of the first and second ZVS assistance currents if the value of the ZVS assistance current deviates from a predetermined reference current value.

3. The method of claim 2, wherein each respective SRC comprises at least one respective switching element and the predetermined reference current value corresponds to the lowest level of current in the respective ZVS-assistance network sufficient for ZVS operation of all switching elements in the respective SRC.

4. The method of claim 2, wherein each of the first and second ZVS assistance networks further comprises a controllable inductor, and wherein the method further comprises changing the value of the inductance of at least one of the controllable inductors when the at least one of the ZVS-assistance currents deviates from a values that ensure proper ZVS operation.

5. The method of claim 1, wherein each ZVS-assistance network further comprises a respective controllable inductor, and wherein the method further comprises changing the inductance value of the respective controllable inductor if the current flowing through the respective ZVS-assistance network deviates from a predetermined value.

6. A dual power converter, comprising:
   a first series resonant converter (SRC) operably coupled to a second SRC in a cascade connected arrangement; and
   first and second zero voltage switching (ZVS)-assistance networks operably coupled between the first and second SRCs.

7. The dual power converter of claim 6, further comprising a first sensor comparing a current flowing through the first ZVS-assistance network to the first and second SRCs.

8. The dual power converter of claim 7, further comprising a second sensor comparing a current flowing through the second ZVS-assistance network to the first and second SRCs.

9. The dual power converter of claim 8, further comprising a controller in operable communication with the first and second sensors and the first and second ZVS assistance networks, the controller being operable to change the value of the current flowing through at least one of the first and second ZVS assistance networks to at least one of the first and second SRCs if the current deviates from a predetermined value.

10. The dual power converter of claim 9, wherein each of the first and second ZVS-assistance networks comprises a controllable inductor, and wherein the controller is operable to change the value of at least one of the first and second controllable inductors if the current flowing throughout least one of the first and second ZVS-assistance networks deviates from at least one of a predetermined value.

11. A method of balancing the voltage between first and second series resonant converter (SRC) cells connected in series to a common high voltage (HV) input, where the first and second SRC cells are configured such that they do not share the same load, the method comprising:
   sensing at least one variable signal from the first SRC cell, wherein the variable signal comprises at least one signal selected from the group consisting of input voltage, input current, output voltage, and output current;
   based on the value of the sensed variable signal, activating at least one respective AC/DC converter coupled to the output of the first respective SRC cell;
   coupling the output of the first activated AC/DC converter associated with the first SRC cell so as to increase the power at a DC output of the second SRC cell; and
   changing the input voltage value of at least one of the first and second SRC cells so as to restore the input voltage balance between the first and second SRC cells.

12. A voltage balancing circuit, comprising:
   a first series resonant converter (SRC) cell, the first SRC cell comprising an input, a DC output, and a first AC/DC converter connected in parallel with the output of the first SRC cell, the first AC/DC converter having an output;
   a second SRC cell operably coupled in series with the first SRC cell, the second SRC cell comprising an input, a DC output, and a second respective power exchange circuit that includes a second respective AC/DC converter connected in parallel with the output of the second SRC cell, the second AC/DC converter having a DC output, wherein the output of the first AC/DC converter is operably coupled so as to be parallel with the DC output of the second SRC cell, and the output of the second AC/DC converter is operably coupled so as to be in parallel with the DC output of the first SRC cell;
   a controller in operable communication with the first and second SRC cells, the controller configured to:
      sense at least one variable signal from each respective SRC cell, wherein the variable signal comprises at least one signal selected from the group consisting of input voltage, input current, output voltage, and output current; and activate, based on the value of the sensed variable signal, at least one of the first and second AC/DC converters coupled to the output of a respective SRC cell, wherein the activated AC/DC converter operates so as to change the input voltage value of the respective SRC cell to which its output is connected, wherein the changing of the input voltage value restores an input voltage balance between the first and second SRC cells.

13. A multi-cell power converter, comprising:

a plurality of groups of cells, each group operably coupled to a common input voltage source and being constructed and arranged to be capable of providing power to a respective load, wherein each group of cells comprises:
- a plurality of dual power converter cells connected in series, each power converter cell including a ZVS assistance network and being operably coupled to a respective transformer via a respective set of primary windings; and
- an output rectifier portion, wherein each respective power converter cell in the plurality of power converter cells is coupled to the output rectifier portion via a respective set of secondary windings on each respective transformer, wherein each respective set of secondary windings is connected in parallel; and a controller in operable communication with at least a portion of the plurality of groups of cells, the controller providing regulation for each respective load connected to each respective group with which the controller is in operable communication, wherein the controller receives at least one of a voltage signal, a current signal, and a power signal from each group with which it is in operable communication and, based at least in part on the at least one of a voltage signal, a current signal, and a power signal, provides a corresponding control signal to the respective group.

14. The multi-cell power converter of claim 13, wherein at least a portion of the power converter cells comprise dual SRC cells, each dual SRC cell comprising:

a first series resonant converter (SRC) operably coupled to a second SRC in a cascade connected arrangement;

first and second zero voltage switching (ZVS)-assistance networks operably coupled in parallel between the first and second SRCs;

a first sensor comparing a current flowing through the first ZVS-assistance network to the first and second SRCs;

a second sensor comparing a current flowing through the second ZVS-assistance network to the first and second SRCs; and a cell controller in operable communication with the first and second sensors and the first and second ZVS assistance networks, the controller being operable to change the value of the current flowing throughout least one of the first and second ZVS assistance networks to at least one of the first and second SRCs if the current deviates from a predetermined value.

15. The multi-cell power converter of claim 14, wherein each of the first and second ZVS-assistance networks comprises a respective controllable inductor, and wherein the cell controller is operable to change the value of at least one of the respective first and second controllable inductors if the current flowing from at least one of the first and second ZVS-assistance networks deviates from a value that ensures proper ZVS operation.

16. The multi-cell power converter of claim 13, wherein at least a portion of the dual power converter cells includes a dual SRC cell comprising:

a first series resonant converter (SRC) cell, the first SRC cell comprising an input, a DC output, and a first AC/DC converter connected in parallel with the output of the first SRC cell, the first AC/DC converter having an output;

a second series resonant converter (SRC) cell operably coupled in series with the first SRC cell, the second SRC cell comprising an input, a DC output, and a second respective power exchange circuit that includes a second respective AC/DC converter connected in parallel with the output of the second SRC cell, the second AC/DC converter having a DC output, wherein the output of the first AC/DC converter is operably coupled so as to be parallel with the DC output of the second SRC cell, and the output of the second AC/DC converter is operably coupled so as to be in parallel with the DC output of the first SRC cell;

an SRC cell controller in operable communication with the first and second SRC cells, the SRC cell controller configured to:
- sense at least one variable signal from each respective SRC cell, wherein the variable signal comprises at least one signal selected from the group consisting of input voltage, input current, output voltage, and output current; and
- activate, based on the value of the sensed variable signal, at least one of the first and second AC/DC converters coupled to the output of a respective SRC cell, wherein the activated AC/DC converter operates so as to change the input voltage value of the respective SRC cell to which its output is connected,
- wherein the changing of the input voltage value restores an input voltage balance between the first and second SRC cells.

17. A method of providing power to multiple loads from a single voltage source, the method comprising:

connecting a plurality of power converter cells in a cascade connected arrangement to form a plurality of groups of cells, wherein each power converter cell in each group is associated with a ZVS assistance network and is operably coupled to a respective transformer via a respective set of primary windings, and wherein each group of cells is operably coupled to a common input voltage source;

operably coupling each respective power converter cell in the group to an output rectifier portion via a respective set of secondary windings on each respective transformer, wherein each respective set of secondary windings is connected in parallel;

sampling at least a portion of the power-related signals in the group; and regulating each respective load operably coupled to each respective group, based at least in part on the sampled power related signals.

18. The method of claim 17, further comprising operably coupling first and second zero voltage switching (ZVS)-assistance networks between the first power converter and the second power converter, each ZVS-assistance network providing a respective ZVS-assistant current flowing through each respective ZVS-assistance network to the first and second power converters.

19. The method of claim 18, further comprising adjusting the value of at least one of the first and second respective ZVS assistance currents if the value of the respective ZVS assistance current deviates from a predetermined reference current value.

20. The method of claim 18, wherein each of the first and second ZVS assistance networks further comprises a respective controllable inductor, and wherein the method further comprises changing the value of at least one of the respective controllable inductors when the at least one of the respective ZVS-assistance currents deviates from a predetermined minimum value.

* * * * *